No. 12,244. REISSUED JULY 19, 1904.

W. KELSO.

CAR COUPLING.

APPLICATION FILED MAR. 10, 1904.

2 SHEETS—SHEET 1.

WITNESSES:
Herbert Bradley.
Fred Kirchner

INVENTOR
William Kelso
by Christy and Christy
Att'ys.

No. 12,244. REISSUED JULY 19, 1904.

W. KELSO.

CAR COUPLING.

APPLICATION FILED MAR. 10, 1904.

2 SHEETS—SHEET 2.

WITNESSES:
Hebed Bradley
Fred Kirchner

William Kelso INVENTOR
by Christy and Christy
Atty's.

No. 12,244.

Reissued July 19, 1904.

UNITED STATES PATENT OFFICE.

WILLIAM KELSO, OF PITTSBURG, PENNSYLVANIA.

CAR-COUPLING.

SPECIFICATION forming part of Reissued Letters Patent No. 12,244, dated July 19, 1904.

Original No. 751,737, dated February 9, 1904. Application for reissue filed March 10, 1904. Serial No. 197,603.

*To all whom it may concern:*

Be it known that I, WILLIAM KELSO, a citizen of the United States, residing at Pittsburg, in the county of Allegheny and State of Pennsylvania, have invented or discovered a certain new and useful Improvement in Car-Couplers, of which improvement the following is a specification.

The invention described herein relates to certain improvements in car-couplers of the swinging-hook or Master Car-Builders' type, and has for its object a construction whereby the knuckles may be opened by the upward or unlocking movement of the locking-pin.

In general terms the invention consists in the arrangement of a knuckle-opening device exterior of the draw-head and adapted when shifted by the locking-pin to operate through an opening in the coupler-head and throw the knuckle to open position.

The invention is hereinafter more fully described and claimed.

Figure 1:
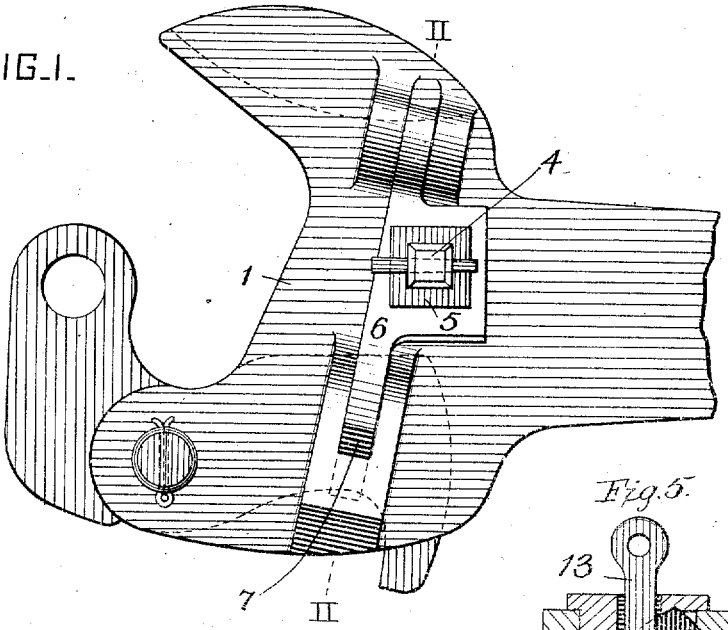
Figure 5:
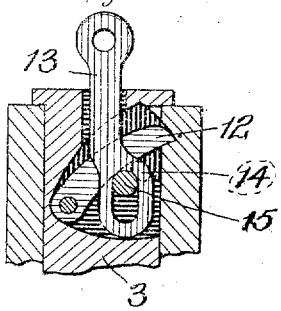
Figure 2:
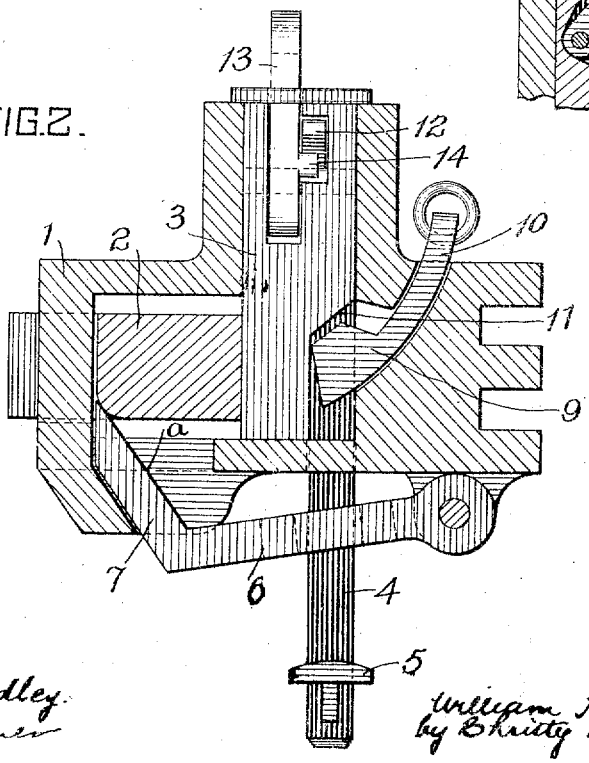
Figure 3:
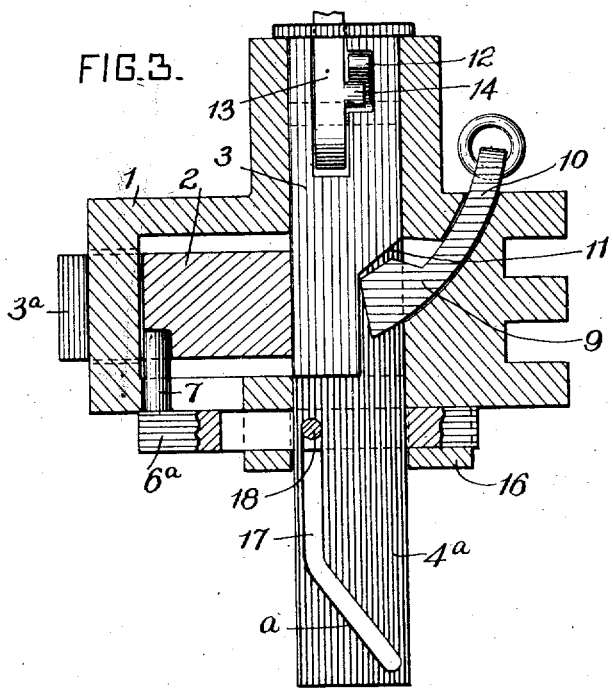
Figure 4:
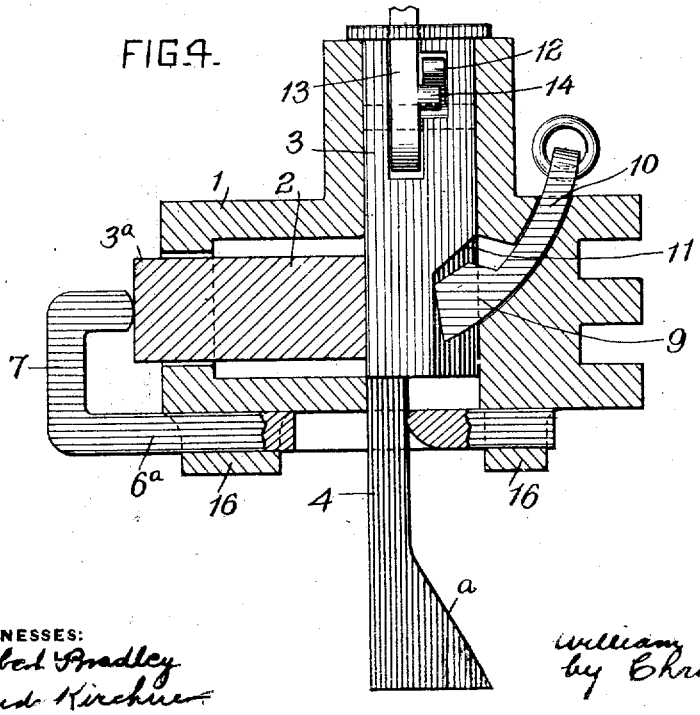

In the accompanying drawings, forming a part of this specification, Figure 1 is a plan view of the under side of a coupler-head of the Master Car-Builders' type having my improvement applied thereto. Fig. 2 is a sectional elevation on a plane indicated by the line II II, Fig. 1. Figs. 3 and 4 are views similar to Fig. 2, illustrating modifications in my improvement; and Fig. 5 is a sectional detail view of the upper portion of the locking-pin, showing a locking-finger to prevent an upward creeping of the locking-block.

In the practice of my invention the coupler as regards its head 1, swinging hook 2, and locking-block 3 is constructed in the usual or any suitable manner, except as hereinafter described. The locking-pin 3 is provided with a stem 4, extending downward from the lower end of the pin or block through the under wall of the coupler-head and provided at or near its lower end with a shoulder 5, adapted when the pin is raised to engage the under side of an arm 6, pivotally mounted on the under side of the coupler-head. At its outer or free end this arm 6 is provided with a finger 7, extending up through an opening in the under side of the coupler. The inner wall or face of this finger is beveled or inclined, as at *a*, so that when the arm is raised by the lifting of the locking-block the tail of the coupler, with which the finger engages, will be forced inwardly, thereby turning the knuckle to open position. By reference to Fig. 2 it will be seen that the stem 4 is made sufficiently long and the shoulder 5 thereon so located that the locking-block 3 may be raised sufficiently to clear the tail of the knuckle before the shoulder reaches and shifts the arm 6, so that during the latter part of its upward movement the only function performed by the locking-block will be to effect the opening of the knuckle. In order to hold the locking-block in its raised position—*i. e.*, in a position where its lower end would clear the tail of the knuckle—I provide a movable stop or shoulder 9, having a curved stem 10 extending through the wall of the coupler-head, as shown in Fig. 2. When the locking-block is in its lower position, the stop 9 rests partly within a groove 11 in the locking-pin and partly in a recess in the coupler-head. As soon as the locking-block reaches unlocking position the movable stop will slide down under the end of the locking-block and support the stem in its raised position until the stop is again forced backward into the recess in the coupler-head by the tail of the knuckle, when the latter is swung to open position or by an upward pull on its stem 10. It will be observed that the stop 9 is held in inoperative position by the locking-pin itself, and hence will become effective to lock the pin in raised position without any movement of the knuckle.

In order to prevent an upward creeping of the locking-block, a finger or dog 12 is pivotally mounted in a recess in the locking-block at or near its upper end. This finger or dog 12 and its recess are so proportioned that the finger may be withdrawn entirely within the recess, or when the locking-block is lowered to locking position the finger will drop down and engage a notch in the wall of the coupler-head, as shown in Fig. 5. An unlocking or upward movement of this pin is effected by means of a lifting member 13, extending down into the recess and provided with a projection 14, adapted to engage the locking-finger. In order to permit of the use of this lifting member for raising the locking-block, its lower end is slotted and is connected to the locking-block by means of a pin 15, passing through the slot. This construction permits of a preliminary upward movement of the lifting member sufficient to shift the finger to unlocking position before it becomes operative to raise the locking-block.

In lieu of arranging the inclined face *a*, whereby an opening of the knuckle is effected, upon the finger 6 it may be located upon the stem extending down from the locking-block, as shown in Fig. 3. As therein shown, the member $6^a$, corresponding to the arm 6, is arranged in a suitable guideway 16, formed on the under side of the coupler-head, and is adapted to slide back and forth therein on the movement of the locking-block. The stem $4^a$ extends down through the slide $6^a$ and is provided with an angular groove 17, the lower portion of such groove being shaped to form the incline *a* at such an angle that when the pin is raised the slide $6^a$ will be forced backward by the pin 18 passing through the slot and engaging the incline *a*, riding along the inclined portion of the slot. The straight portion of the slot is made of a length sufficient to permit of the necessary upward movement of the locking-block to effect an unlocking of the knuckle, so that no shifting movement will commence until the knuckle is free to open.

In the construction shown in Fig. 4 the slide $6^a$ is made of sufficient length to extend slightly beyond the coupler-head and the finger 7 is provided with a turned-over portion adapted to bear against a horn $3^a$ on the tail of the knuckle. In lieu of forming an angular slot in the stem 4 of the locking-block the latter is made straight and is provided at or near its lower end with an inclined face *a*, adapted to bear against the rear wall of a slot formed in the slide $6^a$. In this construction the slide with its finger are returned to normal position by the closing movement of the knuckle, while in the construction shown in Figs. 2 and 3 the return movement of the knuckle-shifting device is independent of the movement of the knuckle, being effected in one case by gravity and in the other case by the dropping of the locking-block.

It will be observed that it is immaterial whether the knuckle-opener is provided with a finger extending through the wall of the coupler-head to engage the knuckle, as shown in Figs. 1 and 2 and 3, or the knuckle is provided with a projection extending through such opening to engage the opener, and hence under the term "operative through an opening in the wall of the coupler-head" both constructions are included.

I claim herein as my invention—

1. A car-coupler of the Master Car-Builders' type having in combination, a swinging hook or knuckle, a locking block or pin provided with a stem, a knuckle-opener movably mounted on the under side of the coupler-head operative on the knuckle through an opening in the wall of the coupler, one of said parts or members having a beveled or inclined portion for transmitting motion from the locking-block to the knuckle, substantially as set forth.

2. A car-coupler of the Master Car-Builders' type having in combination, a swinging hook or knuckle, a locking block or pin, a knuckle-opener movably mounted on the under side of the coupler-head, a connection between the knuckle and opener and a connection between the locking-block and opener, whereby the latter can be shifted by the block, substantially as set forth.

3. A car-coupler of the Master Car-Builders' type having in combination a swinging hook, a locking block or pin, and a sliding stop mounted in the coupler-head and adapted to automatically move under the locking-pin and into the path of the tail of knuckle or swinging hook when the pin is raised to unlocking position and prior to the movement of the knuckle, substantially as set forth.

4. A car-coupler of the Master Car-Builders' type having in combination a swinging hook, a locking-block, a movable stop having a stem projecting through the top of the coupler-head, said stop being adapted to automatically move under the locking-pin and into the path of movement of the swinging hook when the pin is raised to unlocking position and prior to the movement of the knuckle, substantially as set forth.

In testimony whereof I have hereunto set my hand.

WILLIAM KELSO.

Witnesses:
DARWIN S. WOLCOTT,
F. E. GAITHER.